(12) United States Patent
Gentry et al.

(10) Patent No.: US 12,511,451 B2
(45) Date of Patent: Dec. 30, 2025

(54) SYSTEMS AND METHODS FOR PREDICTING THE GEOMETRY AND INTERNAL STRUCTURE OF TURBINE BLADES

(71) Applicant: Georgia Tech Research Corporation, Atlanta, GA (US)

(72) Inventors: Russell Gentry, Atlanta, GA (US); Benjamin Tasistro-Hart, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 1126 days.

(21) Appl. No.: 17/434,588

(22) PCT Filed: Feb. 28, 2020

(86) PCT No.: PCT/US2020/020330
§ 371 (c)(1),
(2) Date: Aug. 27, 2021

(87) PCT Pub. No.: WO2020/176841
PCT Pub. Date: Sep. 3, 2020

(65) Prior Publication Data
US 2022/0138368 A1    May 5, 2022

Related U.S. Application Data

(60) Provisional application No. 62/811,681, filed on Feb. 28, 2019.

(51) Int. Cl.
*G06F 7/48*    (2006.01)
*G06F 30/17*   (2020.01)
(Continued)

(52) U.S. Cl.
CPC .............. *G06F 30/17* (2020.01); *G06F 30/20* (2020.01); *G06Q 10/30* (2013.01)

(58) Field of Classification Search
CPC ......... G06F 30/17; G06F 30/20; G06Q 10/30; F05D 2300/603; F05D 2260/80;
(Continued)

(56) References Cited

U.S. PATENT DOCUMENTS 7,887,295 B2 *  2/2011  Brittingham .............. F01D 5/22
                                                    416/189
9,542,739 B1    1/2017  Salm et al.
(Continued)

OTHER PUBLICATIONS

Search Report and Written Opinion from Application No. PCT/US2020/020330 dated May 21, 2020.
(Continued)

*Primary Examiner* — Nithya J. Moll
(74) *Attorney, Agent, or Firm* — TROUTMAN PEPPER LOCKE LLP; Ryan A. Schneider; Dustin B. Weeks

(57) ABSTRACT

An exemplary embodiment provides a method of predicting a geometry of a turbine blade, comprising: obtaining a point cloud of the turbine blade, the point cloud comprising a plurality of points corresponding to locations on an external contour of the turbine blade; generating an external mesh for the turbine blade based on point cloud; defining a reference axis along the length of the blade; generating a plurality of sampling planes along the length of the reference axis, each sampling plane being normal to the reference axis and having a shape defined by portions of the mesh intersecting the sampling plane; for each of the plurality of sampling planes, matching the sampling plane to an airfoil profile in a database of known airfoil profiles; and creating a geometrical representation of the turbine blade by placing the airfoils on the reference axis and connecting the perimeter of each of the airfoils.

6 Claims, 3 Drawing Sheets

(51) Int. Cl.
*G06F 30/20* (2020.01)
*G06Q 10/30* (2023.01)

(58) Field of Classification Search
CPC ..... G06T 2210/56; G06T 17/20; F01D 5/141; F01D 5/282; Y02W 90/00
See application file for complete search history.

(56) References Cited

U.S. PATENT DOCUMENTS

| | | | |
|---|---|---|---|
| 2009/0064520 A1* | 3/2009 | Sherlock | G01B 3/42 33/562 |
| 2009/0089020 A1 | 4/2009 | Boyer et al. | |
| 2010/0095526 A1 | 4/2010 | Derrien et al. | |
| 2016/0012159 A1* | 1/2016 | Ferrar | G06F 30/28 703/1 |

OTHER PUBLICATIONS

Tasistro-Hart, et al., "Reconstruction of Wind Turbine Blade Geometry and Internal Structure from Point Cloud Data," Computing in Civil Engineering, Jun. 13, 2019 pp. 130-136.

* cited by examiner

SYSTEMS AND METHODS FOR PREDICTING THE GEOMETRY AND INTERNAL STRUCTURE OF TURBINE BLADES

CROSS-REFERENCE TO RELATED APPLICATIONS

This application claims the benefit of U.S. Provisional Application Ser. No. 62/811,681, filed on 28 Feb. 2019, which is incorporated herein by reference in its entirety as if fully set forth below.

FEDERALLY SPONSORED RESEARCH STATEMENT

This invention was made with government support under Grant No. 1701413, awarded by the National Science Foundation. The government has certain rights in the invention.

TECHNICAL FIELD OF THE INVENTION

The various embodiments of the present disclosure relate generally to predictions systems and methods. More particularly, the various embodiments of the present invention are directed to systems and methods for predicting the geometry and internal structure of turbine blades.

BACKGROUND OF THE INVENTION

The production of wind energy worldwide has increased twenty-fold since 2001. Almost all of this energy is generated by three-bladed wind turbines with fiber reinforced polymer (FRP) (e.g., plastic) composite wind blades. Blades for turbines installed in the early 2000s are nearing the end of their 20-year design lives, and the need to recycle the blades has become a well-recognized problem. In addition, many wind farm sites are being re-powered with new and more powerful turbines and blade sets being installed even through the current turbines have not reached their design lives. Advancements in turbine technology have rendered these turbines functionally obsolete. Recycling of the steel and copper that make up most of the turbine mass is well understood, but the potential for recycling or re-purposing the composite materials has not been addressed.

Most blades are constructed from thermoset composites using mostly glass but some carbon fibers. Currently material is recycled by shredding the blades, and the shredded polymer composite material is utilized as partial replacement for coal or natural gas in fossil power plants and the ash for feedstock in cement kilns. Efforts to use the ground waste in the production of new FRP composites shows that the inclusion of recycled materials dramatically decreases the mechanical properties of the material. Chemical and thermal methods are also being investigated. Given this context, there is a need for reuse applications for wind blades, aiming to use entire blades or large parts of blades in architectural and civil infrastructure applications, taking advantage of their structural properties.

Wind blades often range from 9 m to 90 m in length. They are essentially large propellers, whose exterior surface is created by a series of successively more aerodynamic profiles placed along a reference axis. Beginning at the root, a circular section (above 10% of the total length) blends into a series of airfoil sections which taper along their length (about 90% of the total length). As shown in FIG. 1, each profile is located at a specific point away from the start point of the reference axis and provides material information regarding the layering of the composites and cores as well as geometric information that describes the shape of the blade at that point. Structural loading and aerodynamic performance have an inverse relationship along the length of the blade where the root and transitional region have poor aerodynamic performance but carry the highest structural loads while the mid-span and tip have a maximized lift-to-drag ratio and carry less structural loads. Wind blades behave as huge cantilevers, with the primary bending moments carried by a tapering and twisting box beam consistent of spar caps (i.e., flanges) bounded by internal structural webs that are also composed of sandwich panels.

A problem exists, however, in that the specific geometrical structure of these turbines are unknown. The blades are proprietary, that is, the geometry and material structure were created by the original designers and manufacturers of the blades and is not public information. Therefore, there is a desire for systems and methods for determining the geometry of turbine blades. Various embodiments of the present invention address this desire.

BRIEF SUMMARY OF THE INVENTION

The present invention relates to systems and methods for predicting the external geometry of a turbine blade An exemplary embodiment of the present invention provides a method of predicting a geometry of a turbine blade, comprising: obtaining a point cloud of the turbine blade, the point cloud comprising a plurality of points corresponding to locations on an external contour of the turbine blade; generating an external mesh for the turbine blade based on point cloud; defining a reference axis along the length of the blade; generating a plurality of sampling planes along the length of the reference axis, each sampling plane being normal to the reference axis and having a shape defined by portions of the mesh intersecting the sampling plane; for each of the plurality of sampling planes, matching the sampling plane to an airfoil profile in a database of known airfoil profiles; and creating a geometrical representation of the turbine blade by placing the airfoils on the reference axis and connecting the perimeter of each of the airfoils.

In any of the embodiments disclosed herein, the point cloud can include between 50 and 1,000,000 data points.

In any of the embodiments disclosed herein, matching the sampling plane to an airfoil profile in a database of known airfoil profiles can comprise determining a fitness score for the matched airfoil, the fitness score being a mean distance between corresponding points on the airfoil and the sampling plane.

In any of the embodiments disclosed herein, the method can further comprise iteratively altering one or more parameters of the airfoil to reduce the fitness score.

In any of the embodiments disclosed herein, the one or more parameters can comprise a rotation of the airfoil about the reference axis.

In any of the embodiments disclosed herein, the one or more parameters can comprise an offset of the airfoil along a first axis perpendicular to the reference axis.

In any of the embodiments disclosed herein, the one or more parameters can comprise an offset of the airfoil along a second axis perpendicular to the reference axis and first axis.

In any of the embodiments disclosed herein, the one or more parameters can comprise a uniform size scaling factor of the airfoil.

In any of the embodiments disclosed herein, a first axis can be perpendicular to the reference axis and a second axis can be perpendicular to the first axis and reference axis, wherein each airfoil profile in the database of airfoil profiles can be represented by a plurality of points having a first coordinate value on the first axis and a second coordinate value on the second axis.

In any of the embodiments disclosed herein, the method can further comprise stopping the iteratively altering the one or more parameters to reduce the fitness score when successive iterations reduce the fitness score less than a predetermined threshold amount.

turbine blade can be based on the matched airfoil profiles and the altered one or more parameters.

In any of the embodiments disclosed herein, the method can further comprise displaying the geometrical representation of the turbine blade.

Another embodiment of the present invention provides a system for predicting a geometry of a turbine blade. The system can comprise a processor and a memory. The memory can comprise instructions, that when executed by the processor, cause the system to: obtain a point cloud of the turbine blade, the point cloud comprising a plurality of points corresponding to locations on an external contour of the turbine blade; generate an external mesh for the turbine blade based on point cloud; define a reference axis along the length of the blade; generate a plurality of sampling planes along the length of the reference axis, each sampling plane being normal to the reference axis and having a shape defined by portions of the mesh intersecting the sampling plane; for each of the plurality of sampling planes, match the sampling plane to an airfoil profile in a database of known airfoil profiles; and create a geometrical representation of the turbine blade by placing the airfoils on the reference axis and connecting the perimeter of each of the airfoils.

In any of the embodiments described herein, the instructions, when executed by the processor, can further cause the system to iteratively alter one or more parameters of the airfoil to reduce the fitness score.

In any of the embodiments described herein, the instructions, when executed by the processor, can further cause the system to stop iteratively altering the one or more parameters to reduce the fitness score when successive iterations reduce the fitness score less than a predetermined threshold amount.

In any of the embodiments described herein, the instructions, when executed by the processor, can further cause the system to display the geometrical representation of the turbine blade.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

To facilitate an understanding of the principles and features of the present invention, various illustrative embodiments are explained below. To simplify and clarify explanation, the invention is described below as applied to predicting the geometry of a wind turbine blade. One skilled in the art will recognize, however, that the invention is not so limited. Instead, as those skilled in the art would understand, the various embodiments of the present invention also find application in other areas, including, but not limited to, hydro turbine blades, propellers, impellers, and the like.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

As discussed above, turbine blades contain a tremendous quantity of high-quality composite materials, which might be reused in structural architectural, or infrastructural applications, the current problem is that the external geometry of these blades are unknown, and the specific geometry is proprietary information of the blade manufacturers. Accordingly, the present invention provides systems and methods for accurately predicting the external geometry of a given turbine blade.

Figure 1:
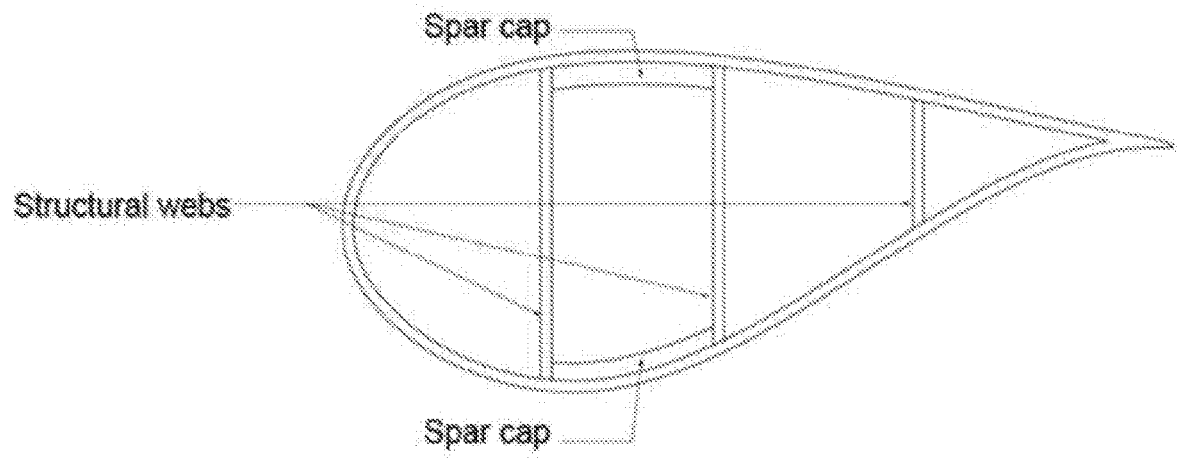
FIG. 1 illustrates a cross-sectional view of a turbine blade.
Figure 2:
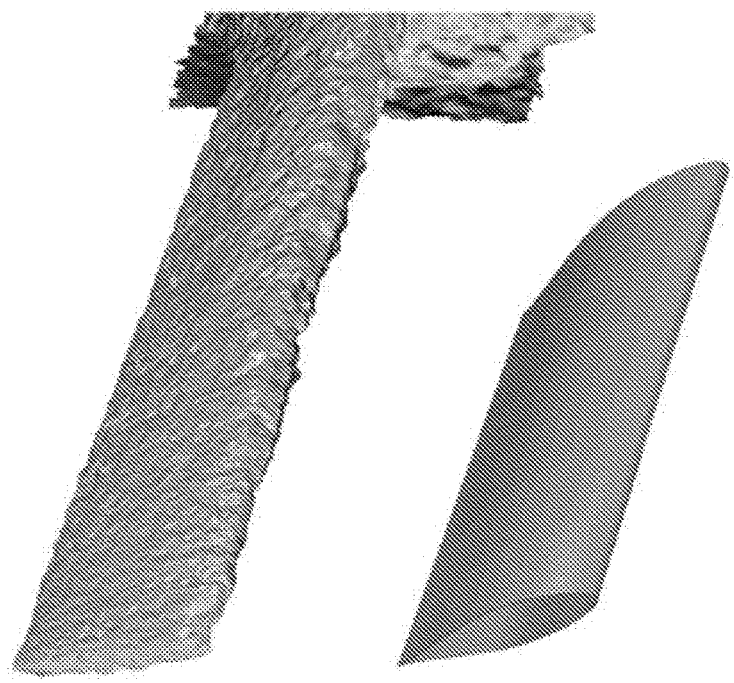
FIG. 2 illustrates a plot of a point cloud of a turbine blade, in accordance with an exemplary embodiment of the present invention.

An exemplary embodiment of the present invention provides a method of predicting a geometry of a turbine blade. The method can begin by obtaining a point cloud of the turbine blade. The point cloud can comprise at least one data point representing a three-dimensional position of an external location of the turbine blade (i.e., the external contour of the blade). FIG. 2 provides an illustration of a point cloud of a turbine blade, in accordance with some embodiments of the present invention. The point cloud can comprise any number of data points. In some embodiments, the point cloud comprises a single data point, but in some embodiments the point cloud comprises more than 1,000,000 data points. As those of skill in the art would appreciate in view of the present disclosure, the accuracy of the geometrical prediction can be directly proportional with the number of data points in the point cloud. The point cloud can be generated using many different techniques known in the art, including, but not limited to, with the use of photogrammetry, laser scanning, LIDAR, and the like. In some embodiments, the method obtaining the point cloud can comprise generating the point cloud. In some embodiments, obtaining the point cloud can comprise accessing a point cloud previously generated, e.g., by another entity.

After obtaining the point cloud, the method can further comprise generating an external mesh for the turbine blade based on the point cloud. The mesh can be generated such that it intersects with the points forming the point cloud.

Figure 3:
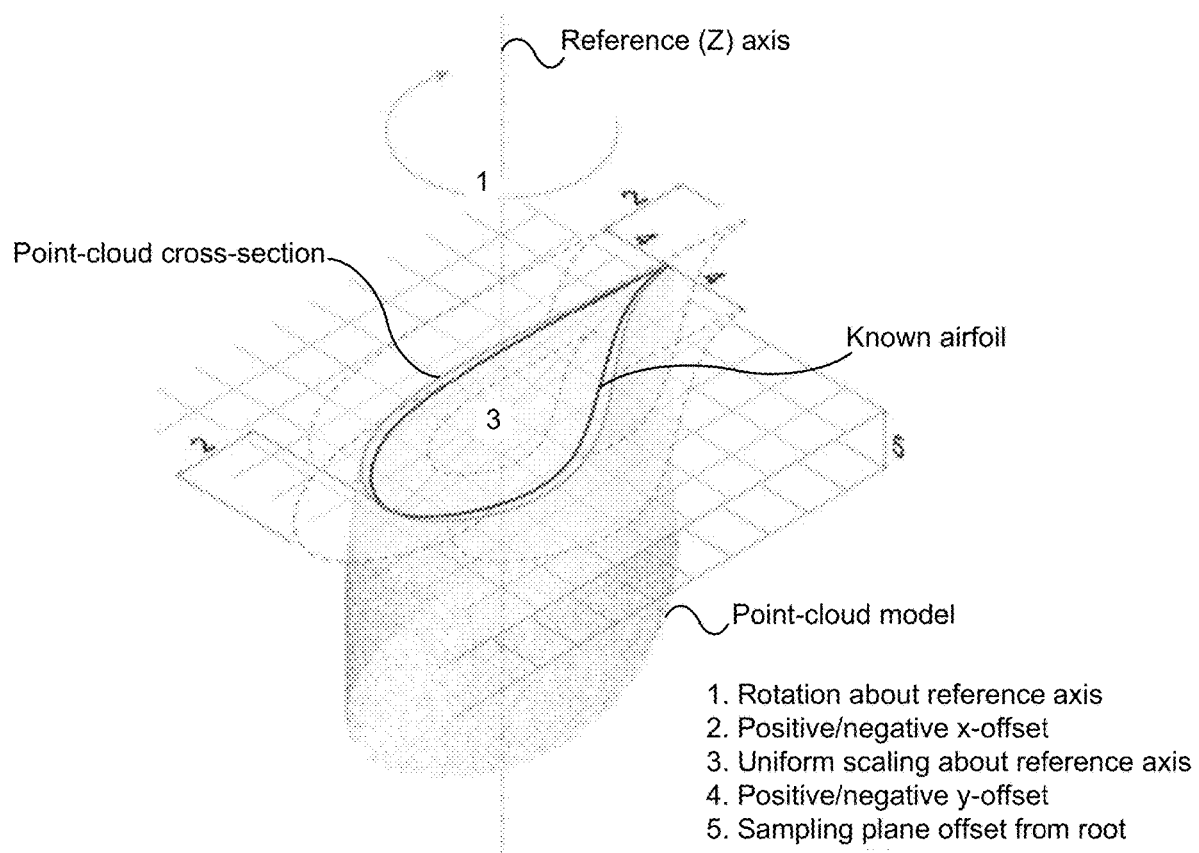
FIG. 3 illustrates a method for predicting the external geometry of a turbine blade, in accordance with an exemplary embodiment of the present invention.

The method can further comprise defining a reference axis along the length of the blade. For example, the reference axis can span along the center point of the length of the blade. The reference axis is shown in FIG. 3.

The method further comprises generating a plurality of sampling planes along the length of the reference axis. Each sampling plane is normal to the reference axis and has a shape defined by portions of the mesh intersecting the sampling plane. Accordingly, as shown in FIG. 3, each sampling plane or point-cloud cross-section can have the shape of an airfoil.

Some exemplary methods also make use of a database of publicly available airfoil profiles. The database can contain a selection of normalized coordinate that describe airfoil profiles. Each of these airfoil shapes can be stored in the database as a set of XY points with, for example, 50-200 points for each airfoil. The X, Y, and Z axes can be described as follows. As shown in FIG. 3, the 3-D representation can be broken down into a z-axis (the reference axis), a first axis (X-axis) perpendicular to the reference axis and a second axis (y-axis) perpendicular to the first axis and reference axis. Each airfoil profile in the database of airfoil profiles can be represented by a plurality of points having a first coordinate value on the first axis and a second coordinate value on the second axis.

For each sampling plane, the sampling plane (or cross section of the point cloud) can be compared to airfoil shapes in the database. The airfoil shape that is a best match to the sampling plane can be selected. For example, an airfoil profile is selected from the database and is compared to a point-cloud section in a 2D XY plane. Given the density of the 3D point cloud (e.g., 500,000 points), the process generally identifies a subset of points, e.g., 500-700 points, with essentially equivalent Z coordinates. The airfoil and point-cloud section curves can be sampled at 100 points equidistant from each other.

The matching process seeks to minimize a "fitness score," representative of how close of a match an airfoil is to the sampling plane. The fitness score can be determined by a least squares minimization as the mean distance between corresponding points on the airfoil and point-cloud section (sampling plane). The process can minimize the fitness score by altering the airfoil selected from the database, in addition to one or more other parameters as shown in FIG. 3, including, but not limited to, the rotation of the selected airfoil about the reference axis, offset in the X-Y direction, uniform size scaling of the selected airfoil, and offset of the sampling plane from the root. The minimization of the fitness score can proceed through an iterative process, such that the fitness of each iteration progressively increases. The iterative process can continue until a change in the fitness score from a previous iteration is less than a predetermined threshold.

Figure 4:
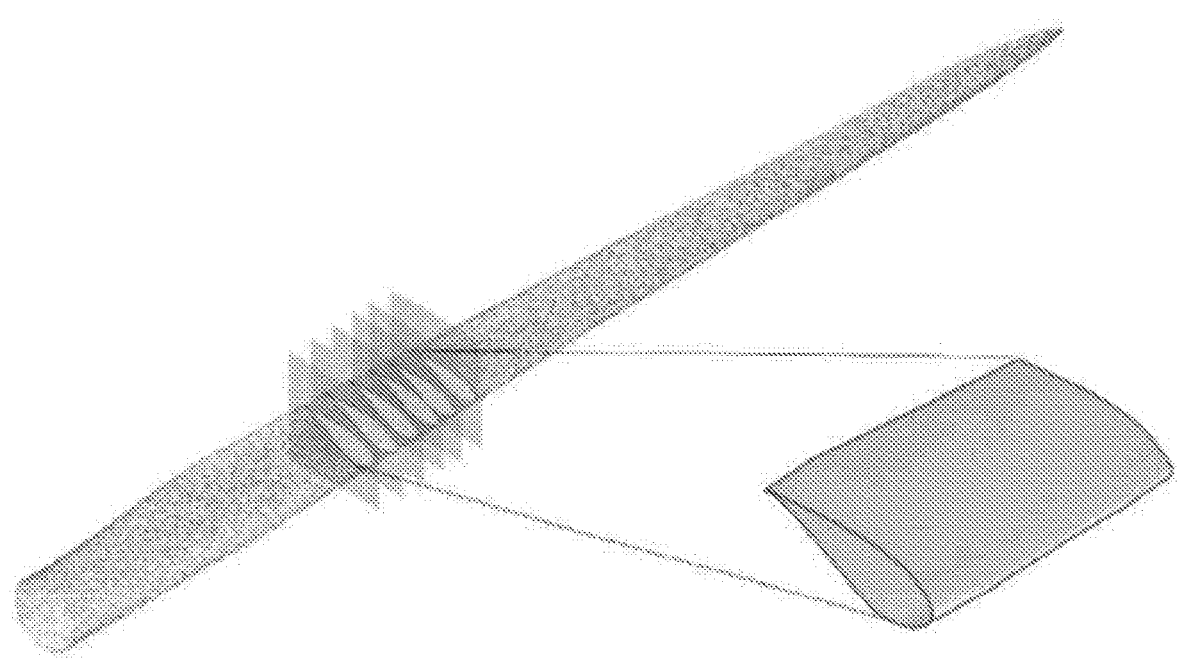
FIG. 4 illustrates a method for predicting the external geometry of a turbine blade, in accordance with an exemplary embodiment of the present invention.

Once the airfoil shape and associated parameter values are determined for each position along the reference axis, a geometrical representation of the turbine blade can be created by placing the airfoils (with corresponding parameter values) on the reference axis and connective the perimeters of each of the airfoils to create an external surface, as shown in FIG. 4. This geometrical representation can be created on the display of a computer.

The process can also include outputting the selected airfoils and associated parameters, together defining the predicted external geometry of the turbine blade.

Embodiments of the present invention also provide systems for predicting the external geometry of a turbine blade. An exemplary system comprises a computing device having a processor and memory. The memory includes instructions stored thereon that can carry out one or more of the methods disclosed herein. The computing device may comprise, for example, a desktop or laptop computer, a server, bank of servers, or cloud-based server bank. The computing device may also comprise one or more processors, which may include a central processing unit (CPU), a graphics processing unit (GPU), or both CPU and GPU, or any other sort of processing unit. The memory may comprise non-transitory computer-readable media, such as volatile and nonvolatile, removable and non-removable tangible, physical media implemented in technology for storage of information, such as computer readable instructions, data structures, program modules, or other data.

In some embodiments, the system can comprise one or more one or more output devices. The output device(s) can include any sort of output devices known in the art, such as a display (e.g., a liquid crystal or thin-film transistor (TFT) display). As discussed above, the display can be used to display the predicted external geometry of the turbine blade.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method for predicting geometry of a turbine blade, the method comprising:
   obtaining a point cloud of the turbine blade, the point cloud comprising data points corresponding to three-dimensional locations on an external contour of the turbine blade;
   generating, based on the point cloud, an external mesh for the turbine blade, the external mesh intersecting with the data points;
   defining a reference axis along a length of the turbine blade;
   generating sampling planes along a length of the reference axis, each respective sampling plane (i) being normal to the reference axis and having a reference axis coordinate (ii) being represented by a plurality of points having at least one first axis coordinate value on a first axis, the first axis being perpendicular to the reference axis, and at least one second axis coordinate value on a second axis, the second axis being perpendicular to the reference axis and the first axis, and (iii) and having a shape defined by one or more portions of the external mesh intersecting the respective sampling plane;
   matching each respective sampling plane to an airfoil profile in a database of known airfoil profiles, each known airfoil profile being represented by a reference value coordinate and at least one first axis coordinate value on the first axis and at least one second axis coordinate value on the second axis, the matching comprising:
      identifying, for each respective sampling plane, a subset of airfoil profiles in the database having a reference axis coordinate substantially similar to the reference axis coordinate of the respective sampling plane; and
      performing an iterative comparison, for each respective sampling plane, by comparing:
         the at least one first axis coordinate value and the at least one second axis coordinate value to an at least one first axis coordinate value and an at least one second axis coordinate value of an airfoil profile of the subset of airfoil profiles represented as "n" to determine a mean distance between corresponding points on the respective sampling plane and the n airfoil profile; and
         the at least one first axis coordinate value and the at least one second axis coordinate value to an at least one first axis coordinate value and an at least one second axis coordinate value of an airfoil profile of the subset of airfoil profiles represented as "n+1" to determine a mean distance between corresponding points on the respective sampling plane and the n+1 airfoil profile;
      selecting, for each respective sampling plane, a matched airfoil profile by minimizing a fitness score, wherein minimizing the fitness score comprises comparing the mean distance between corresponding points on the respective sampling plane and the n airfoil profile and the mean distance between corresponding points on the respective sampling plane and the n+1 airfoil profile until a change in respective distances is less than a predetermined threshold and the matched airfoil profile is selected from either the n airfoil profile or the n+1 airfoil profile; and
   creating a geometrical representation of the turbine blade by placing the matched airfoil profiles on the reference axis and connecting a perimeter of each of the matched airfoil profiles.

2. The method of claim 1, wherein minimizing the fitness score further comprises iteratively altering a parameter of an airfoil profile of the subset of airfoil profiles; and
   wherein the parameter comprises a rotation of the airfoil profile of the subset of airfoil profiles about the reference axis.

3. The method of claim 1, wherein minimizing the fitness score further comprises iteratively altering two or more parameters of an airfoil profile of the subset of airfoil profiles; and
   wherein one of the parameters comprise an offset of the airfoil profile along the first axis perpendicular to the reference axis.

4. The method of claim 3, wherein another one of the parameters comprise an offset of the airfoil profile along the second axis perpendicular to the reference axis and first axis.

5. The method of claim 1, wherein minimizing the fitness score further comprises iteratively altering a parameter of an airfoil profile of the subset of airfoil profiles; and
   wherein the parameter comprises a uniform size scaling factor of the airfoil profile.

6. The method of claim 1 further comprising displaying the geometrical representation of the turbine blade.

* * * * *